United States Patent [19]

White et al.

[11] 4,170,426

[45] Oct. 9, 1979

[54] BALE DISINTEGRATOR AND METHOD

[75] Inventors: Bruce L. White; Edward S. Arter, both of Newton, Kans.; Mark W. Kiner, Perry, Okla.

[73] Assignee: Hesston Corporation, Hesston, Kans.

[21] Appl. No.: 864,590

[22] Filed: Dec. 27, 1977

[51] Int. Cl.$^2$ .............................. B60P 1/08; B60P 1/38
[52] U.S. Cl. .................................... 414/111; 414/112; 414/476; 414/482; 414/491; 414/518; 414/786
[58] Field of Search ................. 214/83.14, 8.5 A, 508, 214/152, 519–522; 241/101 R, 101.7

[56] References Cited

U.S. PATENT DOCUMENTS

| 3,765,551 | 10/1973 | Fisher et al. ................. 214/8.5 A X |
| 4,052,011 | 10/1977 | Burkhart et al. ............. 241/101.7 X |

FOREIGN PATENT DOCUMENTS 548235  3/1977  U.S.S.R. .................................. 241/200

Primary Examiner—Robert G. Sheridan
Attorney, Agent, or Firm—Schmidt, Johnson, Hovey & Williams

[57] ABSTRACT

Bales made from successive charges of material packed against one another are readily separable into relatively discrete "flakes" corresponding to the charges of material from which the bale is built. By passing the bale over the top edge of an incline just before reaching disintegrating mechanism, the leading end flakes of the bale are induced to successively separate therefrom for advancement on down the incline and delivery into the disintegrating mechanism on a more or less individual basis, thereby promoting clog-free operation and even feeding.

12 Claims, 4 Drawing Figures

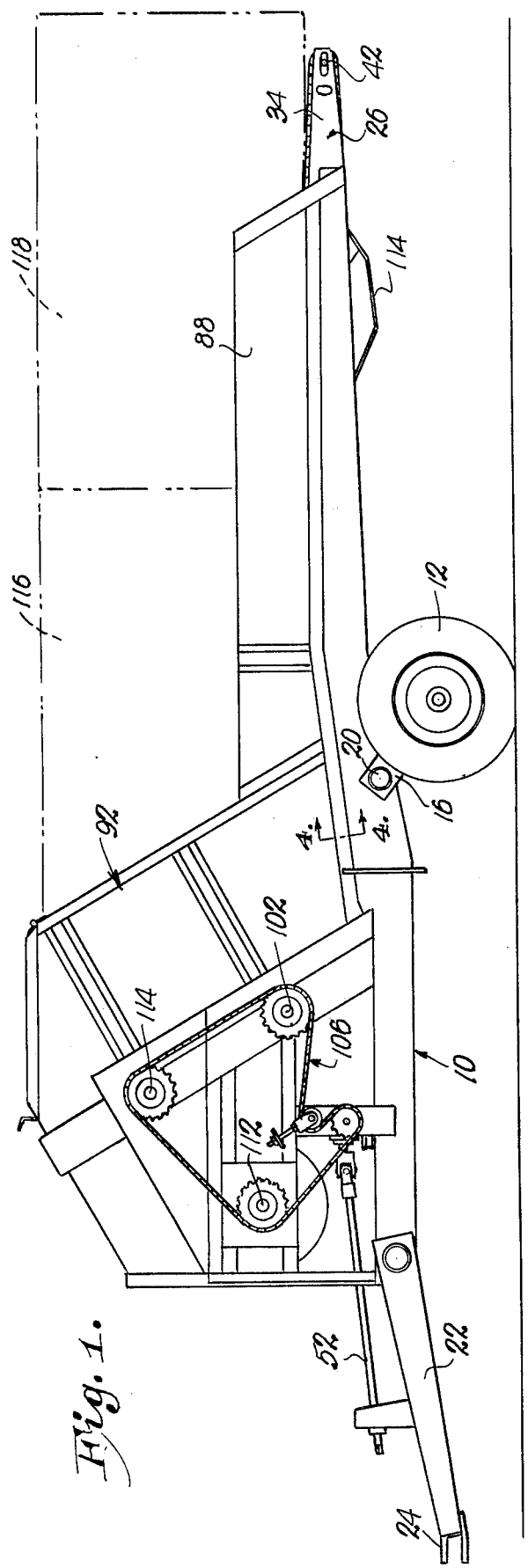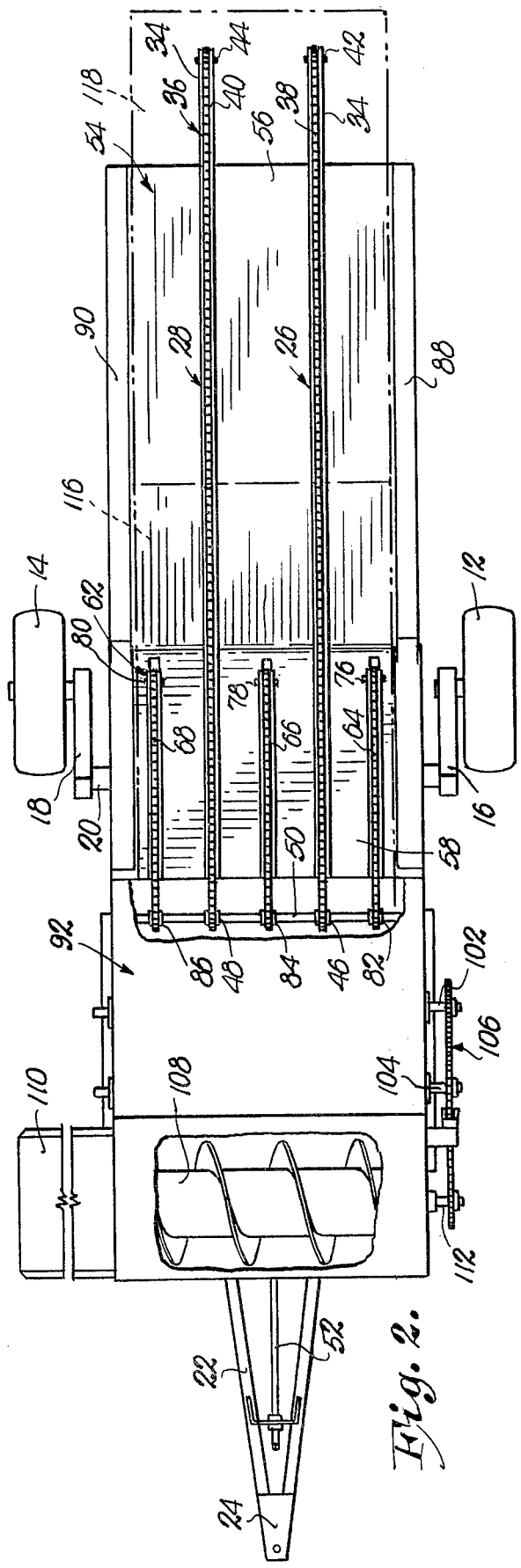

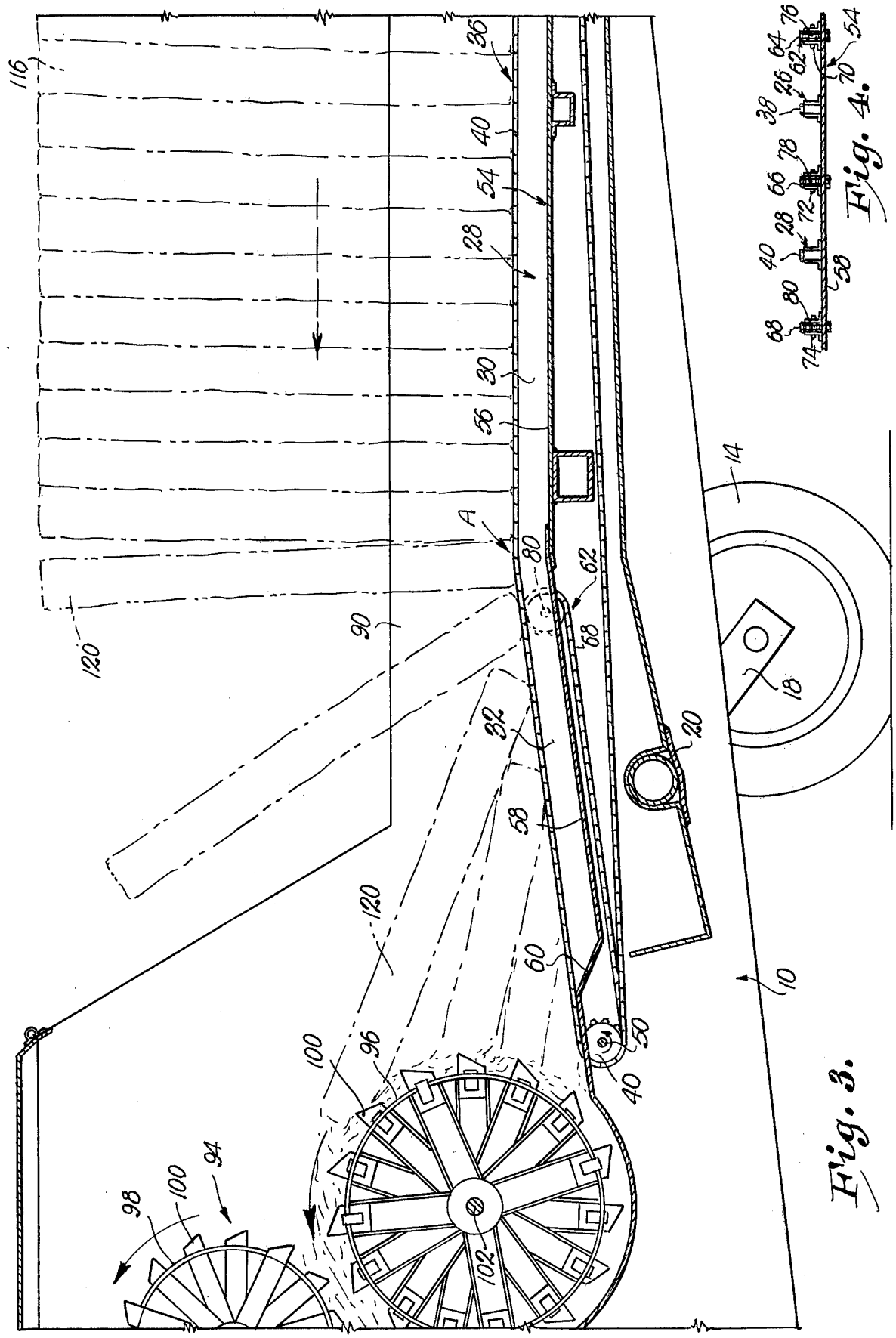

BALE DISINTEGRATOR AND METHOD

This invention relates to improvements in the disintegration of bales of material, such as crop bales used for livestock fodder. It has as its primary object to improve the way in which such bales are delivered into the disintegrating mechanism, to the end that clog-free operation and more even feeding of the material in a discharge stream to the animals will result.

Pursuant to the foregoing, another important object of this invention is to take advantage of the fact that most conventional rectangular crop bales are constituted by a series of relatively discrete "flakes" of material that are packed flatly against one another in the form of initial crop charges during baling, such separability of the flakes permitting the latter to be more or less delivered individually into the disintegrating mechanism, although the bale is initially presented intact to the machine.

More specifically, an important object of this invention is to induce the flakes of the bales to successively separate by gravity therefrom as the bales pass over a certain preselected location on their way to the disintegrating mechanism, whereupon the flakes are successively delivered on an individual basis into the disintegrating mechanism.

A further important object of this invention is to incorporate the foregoing principles into a machine that can readily retrieve bales from the ground and advance them into the disintegrating mechanism without the aid of peripheral loading equipment.

| Prior Art Of Possible Relevance | |
|---|---|
| 3,208,491 | Bliss |
| 3,385,336 | Barnard |
| 3,530,912 | Freeman |
| 2,685,900 | Cross |
| 4,052,011 | Burkhart, et al |
| 3,979,074 | White, et al |
| 3,773,269 | Brooks, et al |
| 3,741,051 | Brooks, et al |
| 3,830,438 | Garrison, et al |
| 3,915,392 | Kugler |
| 3,979,077 | Dalman |
| 3,999,674 | Meitl |

In the drawings:

FIG. 1 is a left-side elevational view of a machine constructed in accordance with the principles of the present invention and capable of carrying out our novel method;

FIG. 2 is a top plan view thereof with portions of the machine broken away to reveal details of construction;

FIG. 3 is a fragmentary, enlarged vertical cross-sectional view through the machine illustrating the manner in which the end flakes are separated as the bale approaches the disintegrating mechanism; and FIG. 4 is a fragmentary, cross-sectional view of the machine taken substantially along line 4—4 of FIG. 1.

The machine has a chassis 10 provided with a pair of ground-engaging wheels 12 and 14 on opposite sides thereof for rendering the chassis 10 mobile. The wheels 12 and 14 are mounted on arms 16 and 18, respectively, secured to the chassis 10 by a torque tube 20 extending the width thereof. The tube 20 is in turn operably coupled with a hydraulic piston and cylinder assembly (not shown) for raising and lowering the chassis 10 with respect to the ground. A tongue 22 extends forwardly from the chassis 10 in fixed relationship therewith, and has a coupling 24 at its forwardmost end for attaching the machine to a towing vehicle (not shown).

The chassis 10 supports a pair of long, fore-and-aft extending, laterally spaced-apart beams 26 and 28 that are equally spaced on opposite sides of the longitudinal center line of the machine. Each of the beams 26, 28 has a main horizontally extending portion denoted by the numeral 30, and a forwardly and downwardly extending inclined portion 32 comprising the approximate forward one third thereof. Each of the beams 26, 28 also has a rearwardly extending, rearmost tip 34.

A conveyor 36 for advancing bales along the beams 26, 28 includes a pair of endless chain elements 38 and 40, the chain 38 being looped longitudinally around the beam 26 so as to present an uppermost bale-engaging length along the top surface of the beam 26, and the chain 40 having the same relationship with the beam 28. Rear sprockets 42 and 44 at the rearmost ends of the beam tips 34 are entrained by respective ones of the chains 38 and 40, while front sprockets 46 and 48 at the forwardmost ends of the inclined beam portions 32 are likewise entrained by respective ones of the chains 38 and 40. The front sprockets 46 and 48 are secured to a transverse drive shaft 50 coupled by means not shown to a fore-and-aft extending shaft 52 above the tongue 22 that may be connected to the power takeoff shaft of the towing vehicle.

The machine is provided with a floor 54 that spans the full width of the machine and is located below the upper surface of the beams 26 and 28 so as to fully expose the latter. The floor 54 includes a horizontal stretch 56 along the horizontal portion 30 of the beams 26, 28, and a downwardly and forwardly inclined stretch 58 corresponding to the inclined portion 32 of the beams 26, 28. The inclined stretch 58 has an upturned section 60 adjacent the forwardmost end thereof, such that the beams 26, 28 converge with the upturned section 60 and literally disappear below the latter at the transverse drive shaft 50, the latter being located below the section 60.

An auxiliary conveyor 62 is provided along the incline defined by the inclined beam portions 32 and the inclined floor stretch 58. Such conveyor 62 takes the form of three endless chain elements 64, 66 and 68 looped longitudinally around and along auxiliary beams 70, 72 and 74 that are interspersed between and extend parallel to the main beams 26, 28. The top surfaces of the auxiliary beams 70, 72 and 74 are disposed at the same level as the corresponding top surfaces of the beams 26, 28, so that the conveyors 36 and 62 are located at the same height along the incline. Rear sprockets 76, 78 and 80 at the rearmost ends of the auxiliary beams 70, 72 and 74, respectively, are entrained by the corresponding chains 64, 66 and 68, such rear sprockets 76, 78 and 80 being in the nature of idlers, while front sprockets 82, 84 and 86 at the forwardmost ends of the auxiliary beams 70, 72 and 74, respectively, are entrained by the auxiliary chains 64, 66 and 68, respectively, and are fixed to the transverse drive shaft 50 for operation thereby. Note that the forward ends of the auxiliary chains 64, 66 and 68, as well as the forward ends of the auxiliary beams 70, 72 and 74, disappear below the upturned floor section 60.

The machine is provided with a pair of laterally spaced sidewalls 88 and 90 that rise from the chassis 10 along the rear portion of the latter. A housing 92 at the front of the machine that is entirely enclosed, except for its rear end which is open, houses disintegrating mechanism 94 in the nature of a pair of transversely extending disintegrator rolls 96 and 98. The disintegrating mechanism 94 is positioned just forwardly of the transverse drive shaft 50, and each of the rolls 96, 98 includes a plurality of peripheral knives 100. The rolls 96 and 98 are mounted on transversely extending shafts 102 and 104, respectively, the lower shaft 102 being located slightly rearwardly of the upper shaft 104 as illustrated so as to correspondingly orient the rolls 96 and 98 with respect to one another.

The shafts 102 and 104 project laterally outwardly beyond the left side of the housing 92 where they are coupled with a chain-and-sprocket assembly 106 that is ultimately connected to the fore-and-aft extending shaft 52 so as to supply driving power to the disintegrator rolls 96, 98 and rotate the same in a counterclockwise direction as viewed in FIG. 3. The chain-and-sprocket assembly 106 likewise supplies driving power to a transversely extending auger 108 located forwardly of the disintegrator rolls 96 and 98 for the purpose of receiving disintegrated crop materials therefrom and transferring the same to the right side of the machine into a trough 110 that may dump the materials outboard of the right wheel 14 into feed bunks or the like. Note that the drive shaft 112 for the auger 108 is located vertically in such a position that the auger 108 is indeed high enough above the ground to deposit its material into an elevated feed trough or the like.

Operation

By actuating the hydraulic cylinder assembly (not shown) associated with the wheels arms 16, 18 so as to raise the wheels 12 and 14 relative to the chassis 10, the latter may be swung downwardly to the ground about the loose connection at coupling 24 until the skids 114 engage the ground. As a result of the fact that the floor 54 terminates short of the tips 34 of the main beams 26, 28 such that the latter project rearwardly from the floor 54 without structure between or beneath the same, such tips 34 are readily suited for being driven beneath a bale lying on the ground for retrieval purposes. As the tips 34 are thusly shoved rearwardly under an awaiting bale, the conveyor 36 is actuated so as to drive its chains 38 and 40 forwardly, hence pulling the bale onto the machine supported by the beams 26, 28. As illustrated in FIGS. 1 and 2, a pair of large rectangular bales 116 and 118 may be carried by the machine, and when the wheels 12, 14 are then lowered with respect to the chassis 10, the latter rises so as to prepare the machine for transport of the bales 116, 118 and disintegration thereof while on the move.

The other movable components of the machine are also actuated at the same time that the conveyor 36 is actuated. Thus, the disintegrator rolls 96 and 98 are rotating in the direction illustrated in FIG. 3, the inclined auxiliary conveyor 62 is being driven forwardly toward the disintegrator rolls 96, 98, and the transverse delivery auger 108 is being driven in a direction to feed materials to the discharge trough 110. As the forward bale 116 is thus advanced toward the disintegrator rolls 96, 98 by the conveyor 36, it passes over a point or location denoted generally by the letter A which is the beginning of the incline formed by the inclined conveyor 62, the inclined beams 70, 72 and 74, the inclined main beam portions 32, and the inclined floor stretch 58.

Inasmuch as the "flakes" 120 of material which comprise the bale 116 are disposed in an upright disposition at this time, they are induced by gravity as they pass over point A to topple forwardly and thus become separated from the rest of the bale 116. As they topple down the incline, they are engaged by the remainder of the conveyor 36, as well as by the auxiliary conveyor 62, and fed more or less on an individual and successive basis into the disintegrator rolls 96, 98. Rolls 96, 98 disintegrate the flakes 120 and present the same to the transverse auger 108 which then delivers the loose material to the discharge trough 110 for subsequent issuance therefrom in a stream.

As a result of the leading flake 120 separating from each bale as it passes over point A, the disintegrator rolls 96 and 98 are not forced to handle an inordinately large mass of crop material at any one time, such as would be the case if the entire bale were fed up against the rolls 96, 98. Thus, the disintegrator rolls 96 and 98 are presented with a volume of material which they can readily handle so that clogging is held to a minimum and even feeding of material through the discharge trough 110 is promoted.

Having thus described the invention, what is claimed as new and desired to be secured by Letters Patent is:

1. In a machine for disintegrating bales having a series of separable flakes of material packed flatly against one another, the improvement comprising:
   disintegrating mechanism;
   a conveyor for progressively delivering a said bale toward said mechanism with said flakes in a generally upstanding disposition; and
   means for separating at least a leading end flake from the bale as it nears said mechanism and for presenting said separated end flake to said mechanism,
   said conveyor being disposed to advance said bale substantially horizontally, said separating means including a downwardly and forwardly extending incline with respect to the direction of travel of said bales for inducing the upright end flake of the bale to fall forwardly by gravity upon reaching said incline, the beginning of said incline being disposed rearwardly behind the forward termination of said conveyor, and said mechanism being disposed at said forward termination of the conveyor.

2. In a machine as claimed in claim 1; and an auxiliary conveyor on said incline for assisting in the feeding of a separated end flake into said mechanism.

3. In a machine as claimed in claim 1, wherein said conveyor includes a pair of elongated, laterally separated, bale-engaging elements and means for driving said elements in the direction of said delivery, each of said elements being provided with an elongated beam extending longitudinally beneath the same and disposed for supporting the weight of the bale during said delivery.

4. In a machine as claimed in claim 3, wherein each of said beams includes a generally horizontal portion spaced from said mechanism and a downwardly and forwardly inclined portion with respect to the direction of said delivery located between said horizontal portion and the mechanism, said separating means including said inclined portions of said beams.

5. In a machine as claimed in claim 4, wherein said elements continue along said inclined portions, as well as said horizontal portions.

6. In a machine as claimed in claim 5; and an auxiliary set of inclined beams and conveying elements interspersed between said inclined beam portions, said auxiliary set of beams and elements being substantially coextensive with said inclined beam portions.

7. In a machine as claimed in claim 4; and a floor extending between said beams at a distance below said elements, said floor including a downwardly and forwardly inclined stretch along said inclined beam portions.

8. In a machine as claimed in claim 7, wherein said elements continue along said inclined beam portions, said inclined stretch of the floor and said inclined beam portions converging rearwardly adjacent said mechanism.

9. In a machine as claimed in claim 4; and means for rendering the machine mobile, said machine being lowerable to the ground for loading ground-lying bales onto said beams as the latter are forced under a bale.

10. In a machine as claimed in claim 7; and means for rendering the machine mobile, said machine being lowerable to the ground for loading ground-lying bales onto said beams as the latter are forced under a bale, said beams extending rearwardly beyond said floor to present rearwardly projecting tips.

11. In a machine as claimed in claim 10, wherein said elements are looped around said tips.

12. A method for use in disintegrating bales having a series of separable flakes of material packed flatly against one another, said method including the steps of:
  supporting a bale from beneath the same with said flakes generally upright;
  advancing the supported bale toward disintegrating mechanism therefor;
  inducing successive leading end flakes of the bale to separate therefrom by gravity as the bale passes over a predetermined location before reaching the mechanism; and
  successively advancing the separated flakes into the mechanism,
  said inducing step including exposing the bale to a downwardly and forwardly extending incline at said location,
  said advancing of the separated flakes including applying a conveying force beneath the separated flakes that moves down the incline toward the mechanism.

* * * * *